United States Patent
Lee et al.

(10) Patent No.: US 7,633,526 B2
(45) Date of Patent: Dec. 15, 2009

(54) CAMERA SYSTEMS WITH VIBRATION COMPENSATION AND METHODS THEREOF

(75) Inventors: Yu-Ting Lee, Taichung (TW); Chih-Yang Chiang, Taichung (TW); Lung-Pin Chung, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 354 days.

(21) Appl. No.: 11/776,034

(22) Filed: Jul. 11, 2007

(65) Prior Publication Data

US 2008/0012946 A1    Jan. 17, 2008

(30) Foreign Application Priority Data

Jul. 14, 2006  (TW) ............................... 95125773 A

(51) Int. Cl.
*H04N 5/228*   (2006.01)
*G03B 17/00*   (2006.01)

(52) U.S. Cl. ............ 348/208.4; 348/208.7; 348/208.99; 396/53; 396/55

(58) Field of Classification Search ............. 348/208.4, 348/208.7, 208.99; 396/53, 55
See application file for complete search history.

(56) References Cited

U.S. PATENT DOCUMENTS

| 5,335,032 A | * | 8/1994 | Onuki et al. ................. 396/50 |
| 5,479,236 A | * | 12/1995 | Tanaka ......................... 396/55 |
| 5,537,185 A | * | 7/1996 | Ohishi et al. ................. 396/55 |
| 5,617,177 A | * | 4/1997 | Imafuji et al. ................ 396/53 |
| 5,850,575 A | | 12/1998 | Ohishi |
| 6,332,060 B1 | | 12/2001 | Miyamoto et al. |
| 6,392,696 B1 | | 5/2002 | Onuki |
| 6,694,096 B1 | * | 2/2004 | Imada ........................ 396/52 |

* cited by examiner

*Primary Examiner*—Nhan T Tran
*Assistant Examiner*—Quang V Le
(74) *Attorney, Agent, or Firm*—Thomas, Kayden, Horstemeyer & Risley

(57) ABSTRACT

Camera systems and methods with vibration compensation. The system comprises a first sensor, a second sensor, and a processing module. The first sensor detects an angle variation of a movement of a camera device to generate first sensed data. The second sensor detects a position movement of an image sensor of the camera device to generate second sensed data. The processing module takes the first derivative of the second sensed data, and calculates control information according to the first sensed data and the differential of the second sensed data. The processing module enables a drive device to adjust the position of the image sensor based on the control information.

18 Claims, 7 Drawing Sheets

CAMERA SYSTEMS WITH VIBRATION COMPENSATION AND METHODS THEREOF

BACKGROUND OF THE INVENTION

1. Field of the Invention

The disclosure relates to camera systems and more particularly to systems and methods of vibration compensation.

2. Description of the Related Art

Recently, digital cameras have become commonplace, due to ease of review and processing of captured images in related devices such as computers.

Vibration occurs in all cameras, particularly in digital cameras with light weight and thin volume. In handheld use, blurring easily occurs. Anti-vibration compensation is provided in digital cameras accordingly.

Anti-vibration mechanisms disclosed in U.S. Pat. Nos. 6,332,060 and 5,850,575 employ a position sensor to detect movements of an image sensor. U.S. Pat. No. 6,332,060 detects a vibration velocity of a camera device using a Hall unit, and takes the first derivative of the vibration velocity. U.S. Pat. No. 5,850,575 detects a position movement of a camera device using a Hall unit, and takes the first derivative of the position movement. A processor calculates a compensation value according to the detected data, and enables a group of compensation lenses to compensate the vibration and avoid blurring. However, if significant movement of the compensation lens is required, lenses may collide with each other.

In an anti-vibration mechanism disclosed in U.S. Pat. No. 6,392,696, a gyro sensor is set in the camera lens to detect vibration velocity of the camera. A camera processor calculates a compensation value according to the detected data, and compensates vibration according to the compensation value via a compensation device coupled to the camera, solving the vibration problem.

BRIEF SUMMARY OF THE INVENTION

Camera systems and methods with vibration compensation are provided.

An embodiment of a camera system with vibration compensation comprises a first sensor, a second sensor, and a processing module. The first sensor detects an angle variation of a movement of a camera device to generate first sensed data. The second sensor detects a position movement of an image sensor of the camera device to generate second sensed data. The processing module takes the first derivative of the second sensed data, and calculates control information according to the first sensed data and the differential of the second sensed data. The processing module enables a drive device to adjust the position of the image sensor based on the control information.

In an embodiment of a camera method with vibration compensation, an angle variation of a movement of a camera device is detected by a first sensor to obtain first sensed data. A position movement of an image sensor of the camera device is detected by a second sensor to obtain second sensed data. The first derivative of the second sensed data is taken to obtain the differential thereof. Control information is calculated according to the first sensed data and the differential of the second sensed data, and a drive device is enabled to adjust the position of the image sensor based on the control information.

Camera systems and methods with vibration compensation may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Camera systems and methods with vibration compensation are provided.

Figure 1:
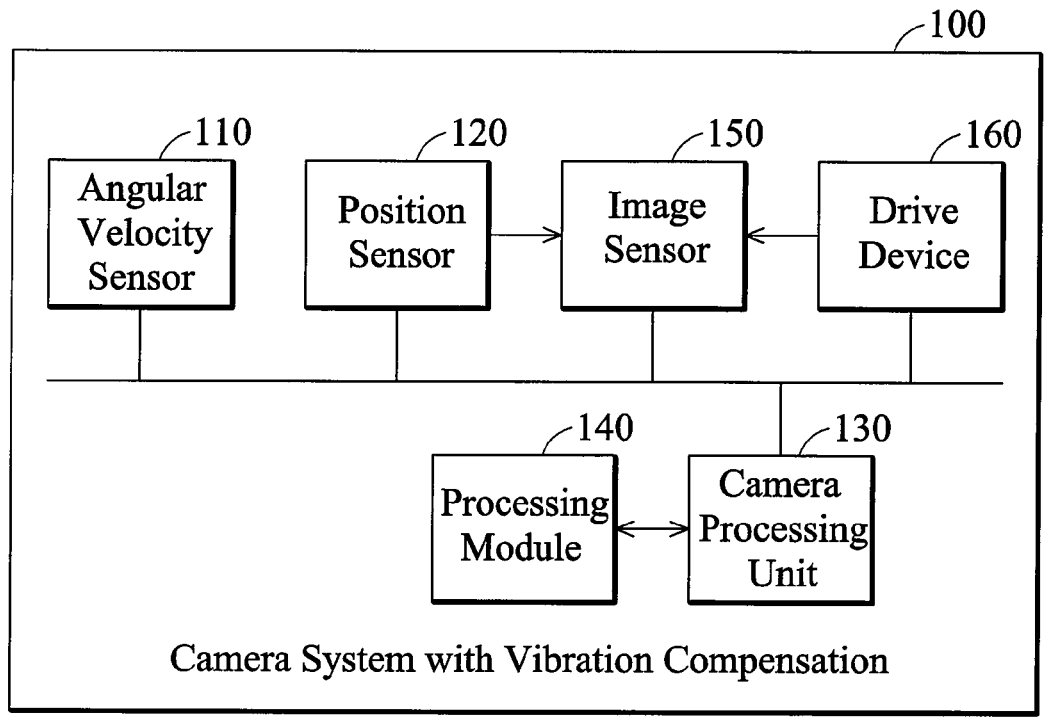
FIG. 1 is a schematic diagram illustrating an embodiment of a camera system with vibration compensation.

FIG. 1 is a schematic diagram illustrating an embodiment of a camera system with vibration compensation. The system may be a camera device such as a digital camera. As shown in FIG. 1, the camera system with vibration compensation 100 comprises an angular velocity sensor 110, a position sensor 120, a camera processing unit 130, a processing module 140, an image sensor 150, and a drive device 160.

Figure 3A:
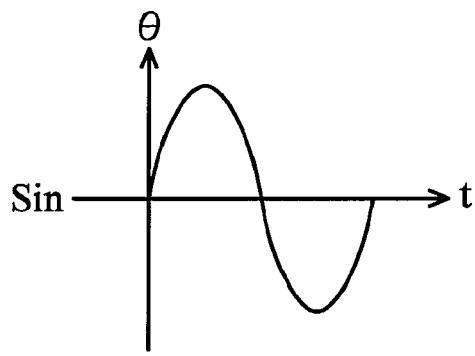
FIGS. 3A, 3B and 3C are waveform diagrams illustrating the relationships between time detected by an angular velocity sensor and angle, angular velocity, and angular acceleration, respectively.
Figure 3B:
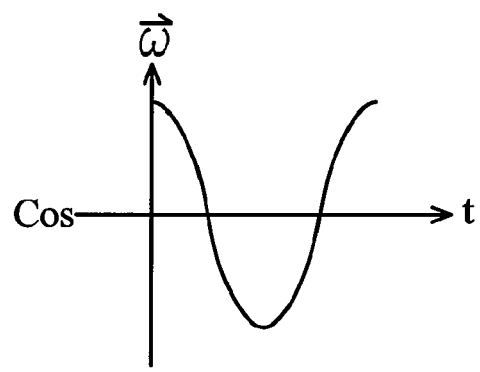
Figure 3C:
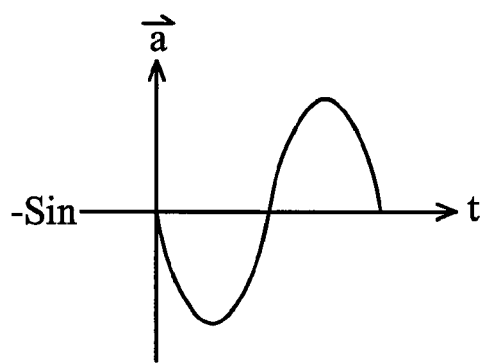

The angular velocity sensor 110 may be a gyro sensor set in the camera device. The angular velocity sensor 110 detects an angle variation of a movement of the camera device to generate corresponding sensed data. The sensed data of the angular velocity sensor 110 is angular velocity ($\vec{\omega}$) variation under time (t), as shown in FIG. 3B. The integral of the sensed data of the angular velocity sensor 110 is angular (θ) variation under time (t), as shown in FIG. 3A. The differential of the sensed data of the angular velocity sensor 110 is angular acceleration ($\vec{a}$) variation under time (t), as shown in FIG. 3C.

Figure 4A:
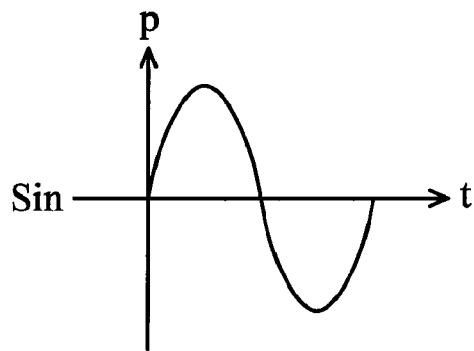
FIGS. 4A, 4B and 4C are waveform diagrams illustrating the relationships between time detected by a position sensor and position, velocity, and acceleration, respectively.
Figure 4B:
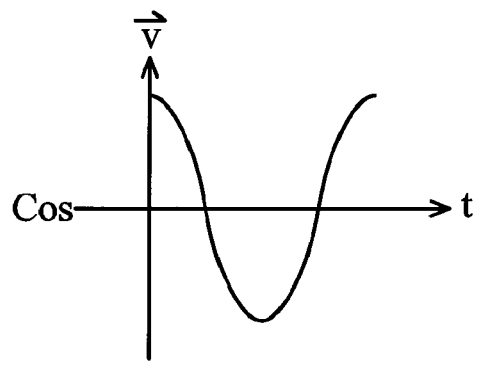
Figure 4C:
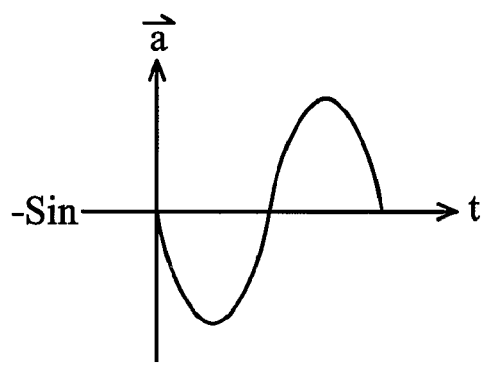

The image sensor 150 may be a charge coupled device (CCD) or complementary metal oxide semiconductor (CMOS) set on a supporter for image capture, where the supporter can move vertically and horizontally. The position sensor 120 may be a Hall effect sensor. The position sensor 120 detects a position movement of the image sensor 150 to generate corresponding sensed data. The sensed data of the position sensor 120 is position (p) variation under time (t), as shown in FIG. 4A. The differential of the sensed data of the position sensor 120 is velocity ($\vec{v}$) variation under time (t), as shown in FIG. 4B. The second differential of the sensed data of the position sensor 120 is acceleration ($\vec{a}$) variation under time (t), as shown in FIG. 4C.

Figure 2:
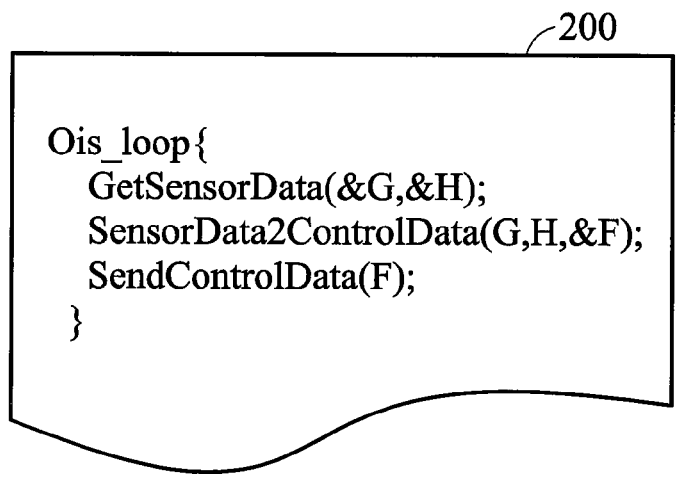
FIG. 2 shows an example of an embodiment of pseudo-codes for data transmission between a processing module and a camera processing unit.

The digital processing unit 130 controls and manages related hardware and operations for image capture and processing in the digital camera. The processing module 140 obtains the sensed data of the angular velocity sensor 110 and the position sensor 120 from the camera processing unit 130. The processing module 140 performs related calculation based on the sensed data of the angular velocity sensor 110 and the position sensor 120 to obtain related control information, and transmits the control information to the camera processing unit 130. FIG. 2 shows an example of an embodiment of pseudo-codes 200 for data transmission between the processing module 140 and the camera processing unit 130. In this example, "GetSensorData(&G,&H)" represents the processing module 140 obtaining the sensed data (G) from the angular velocity sensor 110 and the sensed data (H) from the position sensor 120 from the camera processing unit 130. "SensorData2ControlData(G,H,&F)" represents calculation of control information (F) according to the sensed data of the angular velocity sensor 110 and the position sensor 120. "SendControlData(F)" represents the processing module 140 transmitting the control information to the camera processing unit 130. After receiving the control information, the camera processing unit enables the drive device 160 to adjust the position of the image sensor 150 based on the control information. It is understood that, in some embodiments, the processing module 140 can be integrated into the camera processing unit 130, such that the processing module 140 can directly perform related calculation according to the sensed data of the angular velocity sensor 110 and the position sensor 120 to obtain the control information.

The drive device 160 may be a coil drive unit, piezoelectric actuator, or step motor to move the position of the image sensor 150, thereby stabilizing the camera system and compensating vibration. It is understood that the drive device 160 is not limited thereto. Further, the control information is different according to the design of the drive device 160. For example, the control information may be a control voltage output to the drive device 160, where voltages with different pulse heights and widths cause the drive device 160 to make different adjustments on the image sensor 150.

Figure 7:
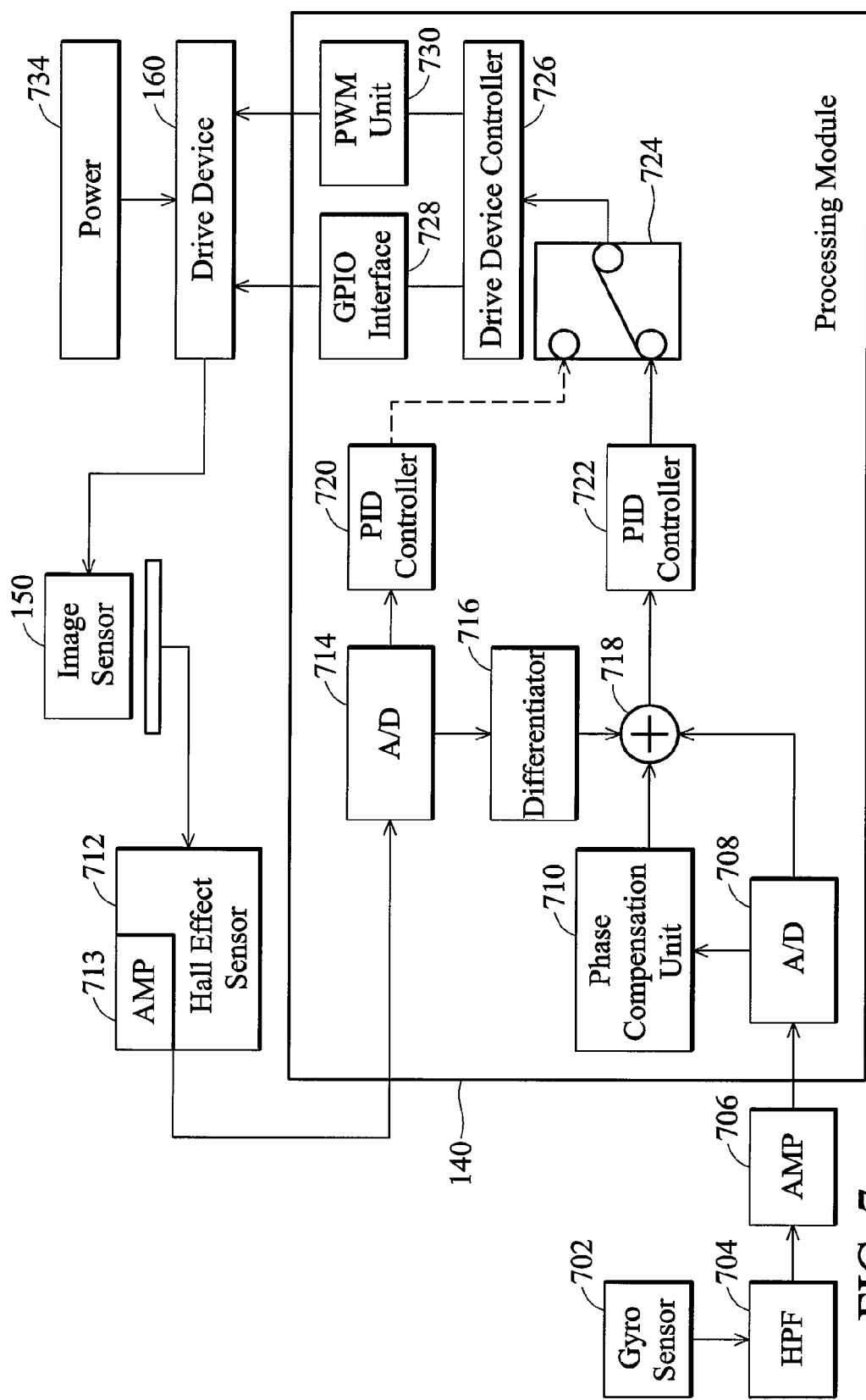
FIG. 7 is a schematic diagram illustrating an embodiment of a camera system with vibration compensation.

FIG. 7 is a schematic diagram illustrating an embodiment of a camera system with vibration compensation. A gyro sensor 702 detects an angle variation of a movement of a camera device, and transmits signals to a high pass filter (HPF) 704. The HPF 704 eliminates noise drifts or needless parts from the signals. The signals are amplified by an amplifier (AMP) 706, and input to an analog to digital (A/D) converter 708 in the processing module 140. The A/D converter 708 converts the signals detected by the gyro sensor 702 into digital sensed data, and transmits the sensed data to a combination unit 718 such as an adder. It is understood that the signals from the A/D converter 708 are also input to a phase compensation unit 710 for compensation calculation. The related phase compensation data calculated by the phase compensation unit 710 is input to the combination unit 718. A Hall effect sensor 712 detects a position movement of the image sensor 150. The Hall effect sensor 712 comprises an amplifier 713 amplifying signals detected by the Hall effect sensor 712. The Hall effect sensor 712 transmits the signals to an analog to digital (A/D) converter 714 in the processing module 140. The A/D converter 714 converts the signals detected by the Hall effect sensor 712 into digital sensed data, and transmits the sensed data to a differentiator 716. The differentiator 716 takes the first derivative of the sensed data, and transmits the differential of the sensed data from the Hall effect sensor 712 to the combination unit 718. The combination unit 718 processes the sensed data from the Hall effect sensor 712, the sensed data from the gyro sensor 702, and the phase compensation data, and outputs the processed data to a proportional-integral-derivative (PID) controller 722. The PID controller 722 performs analysis for vibration compensation according to the received data, and generates control information. Additionally, the digital sensed data from the A/D converter 714 is also input to a PID controller 720. The PID controller 720 performs analysis for vibration compensation according to the sensed data from the Hall effect sensor 712, and generates control information. It is understood that output of the PID controllers 720 and 722 is coupled to a selection unit 724. Control information is selected according to different situations for related control via the selection unit 724. A drive device controller 726 receives the control information, and generates and transmits direction and pulse width modulation (PWM) signals to the drive device 160 via a general purpose input/output (GPIO) interface 728 and PWM unit 730. The drive device 160 is provided with power 734, and adjusts the position of the image sensor 150 according to the direction and PWM signals.

Figure 8:
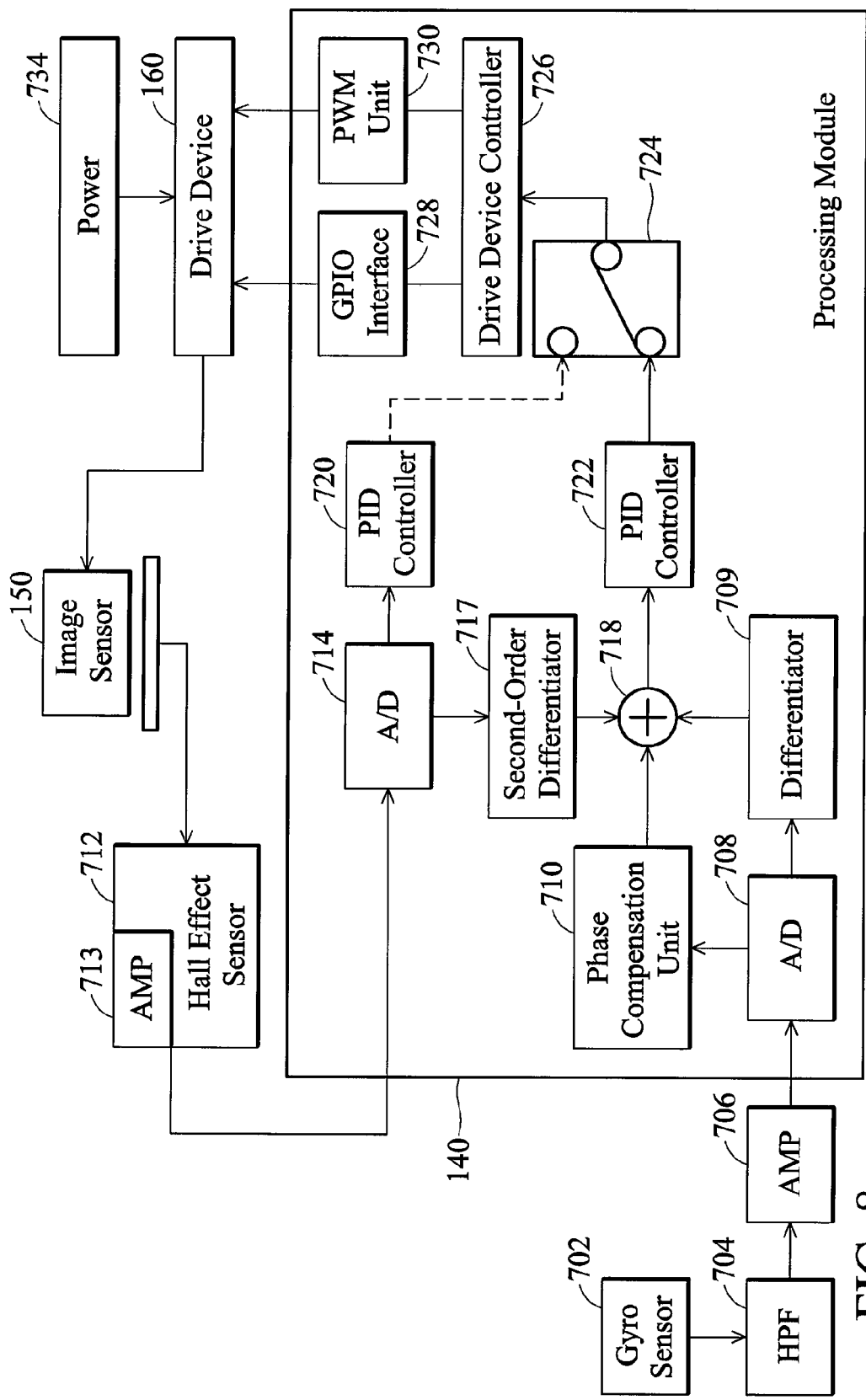
FIG. 8 is a schematic diagram illustrating another embodiment of a camera system with vibration compensation.

FIG. 8 is a schematic diagram illustrating another embodiment of a camera system with vibration compensation. Unlike FIG. 7, here the A/D converter 708 further transmits the digital sensed data from the gyro sensor 702 to a differentiator 709. The differentiator 709 takes the first derivative of the sensed data, and transmits the differential of the sensed data from the gyro sensor 702 to the combination unit 718. Additionally, the differentiator 716 is replaced by a second-order differentiator 717. The second-order differentiator 717 takes the second derivative of the sensed data, and transmits the second differential of the sensed data from the Hall effect sensor 712 to the combination unit 718.

Figure 5:
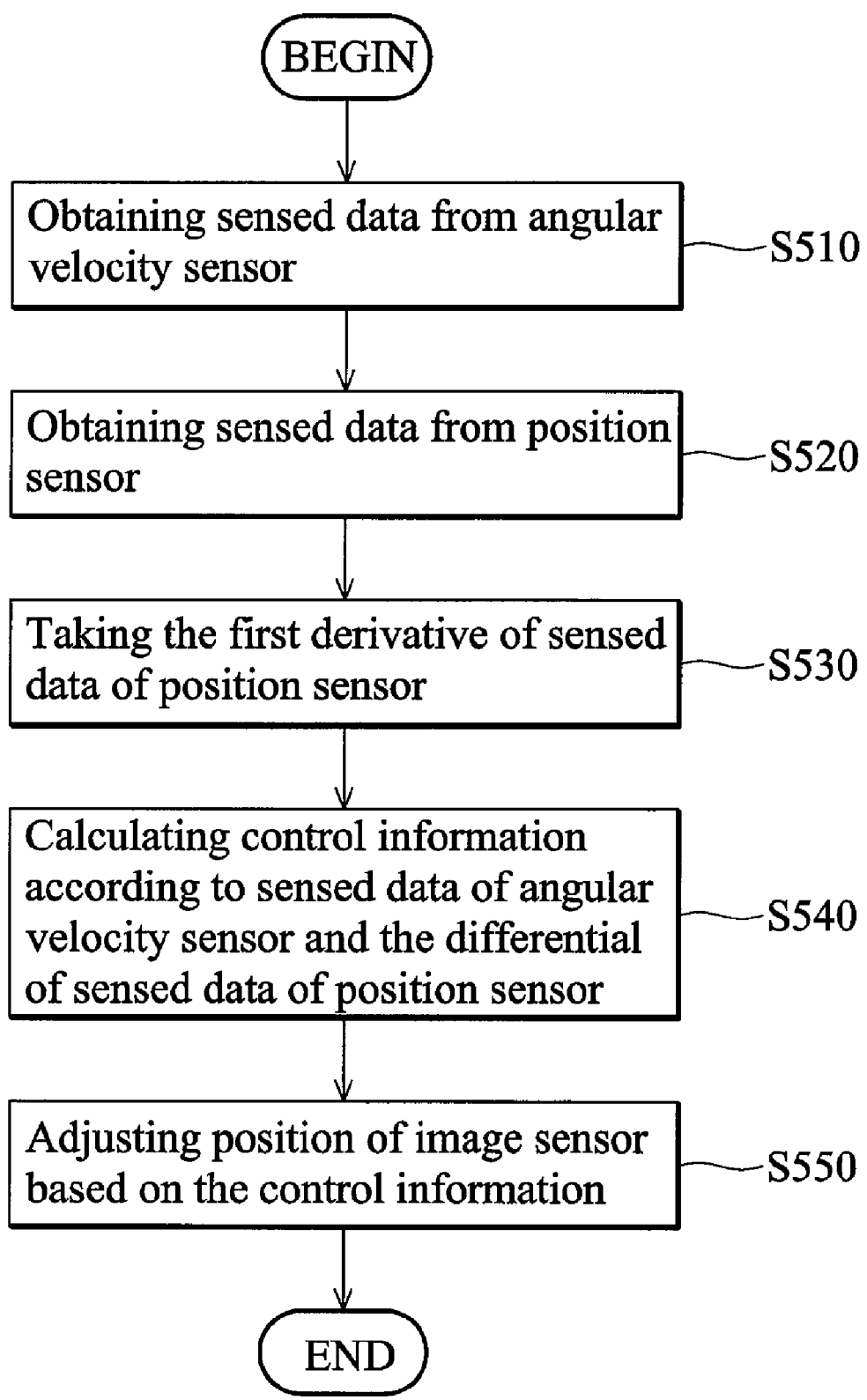
FIG. 5 is a flowchart of an embodiment of a camera method with vibration compensation.

FIG. 5 is a flowchart of an embodiment of a camera method with vibration compensation.

In step S510, the sensed data (G) from the angular velocity sensor 110 is obtained, and in step S520, the sensed data (H) from the position sensor 120 is obtained. The angular velocity sensor 110 detects an angle variation of a movement of the camera device, and the position sensor 120 detects a position movement of the image sensor 150. In step S530, the first derivative of the sensed data from the position sensor 120 is taken to obtain the differential thereof $$\left(\frac{dH}{dt}\right).$$

In step S540, control information is calculated according to the sensed data (G) from the angular velocity sensor 110 and the differential of the sensed data $$\left(\frac{dH}{dt}\right)$$

from the position sensor 120. The processing module 140 calculates the control information as follows:

$$F = \left|G - \frac{dH}{dt}K_0\right|K_1 = |G_0 - (H_1 - H_0)K_0|K_1,$$

where F is the control information, G is the sensed data from the angular velocity sensor 110, H is the sensed data from the position sensor 120, $K_0$ is an adjustment coefficient between the units of sensed data from the angular velocity sensor 110 and the position sensor 120, and $K_1$ is a transformation coefficient between the sensed data from the angular velocity sensor 110 and the control information corresponding to the drive device 160. It is noted that $G_0$ is sensed data from the angular velocity sensor 110 at the 0th time point, and $H_0$ and $H_1$ are sensed data from the position sensor 120 at the 0th and 1st time point.

In step S550, the drive device 160 is enabled to adjust the position of the image sensor 150 based on the control information. Ideally, the difference between sensed data from the angular velocity sensor 110 and position sensor 120 is zero. If the difference does not equal zero, the difference can be used to control and adjust the image sensor 150. It is understood that the drive device 160 of the invention is not limited to any kind of mechanism, and the control information and related coefficients ($K_0$ and $K_1$) are dependent on the designs of the drive device 160. The drive device 160 can move the position of the image sensor 150 according to the control information.

Figure 6:
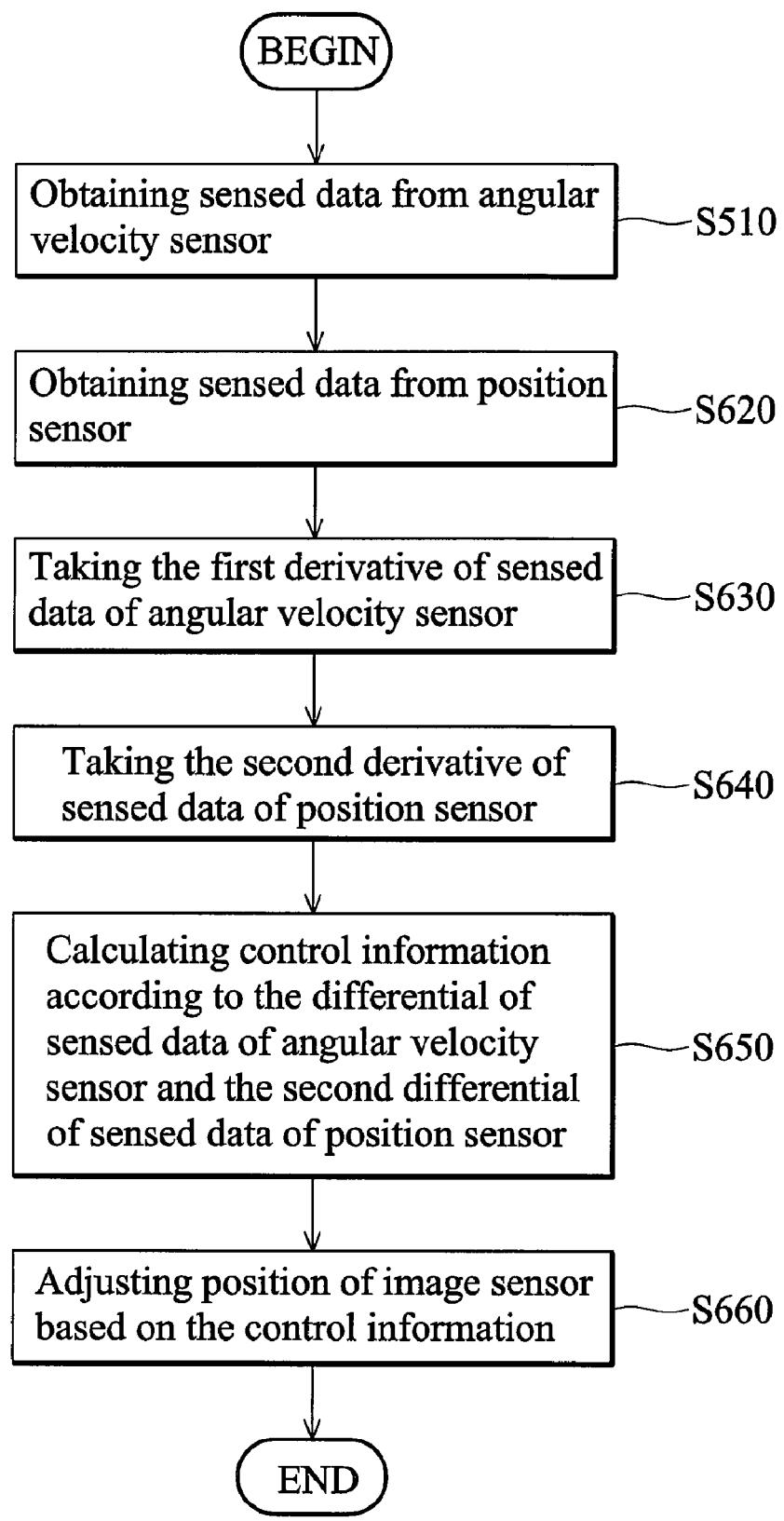
FIG. 6 is a flowchart of another embodiment of a camera method with vibration compensation.

As described, the baselines of sensors in the camera system may drift. The drift problem is addressed in another embodiment of the camera method with vibration compensation, as shown in FIG. 6.

In step S610, the sensed data (G) from the angular velocity sensor 110 is obtained, and in step S620, the sensed data (H) from the position sensor 120 is obtained. The angular velocity sensor 110 detects an angle variation of a movement of the camera device, and the position sensor 120 detects a position movement of the image sensor 150. In step S630, the first derivative of the sensed data from the angular velocity sensor 110 is taken to obtain the differential thereof $$\left(\frac{dG}{dt}\right),$$

and in step S640, the second derivative of the sensed data from the position sensor 120 is taken to obtain the second differential thereof $$\left(\frac{d^2H}{dt^2}\right).$$

In step S650, control information is calculated according to the differential of the sensed data $$\left(\frac{dG}{dt}\right)$$

from the angular velocity sensor 110 and the second differential of the sensed data $$\left(\frac{d^2H}{dt^2}\right)$$

from the position sensor 120. The processing module 140 calculates the control information as follows:

$$F = \left|\frac{dG}{dt} - \frac{d^2H}{dt^2} K_2\right| K_3 = |(G_1 - G_0) - [(H_2 - H_1) - (H_1 - H_0)]K_2|K_3,$$

where F is the control information, G is the sensed data from the angular velocity sensor 110, H is the sensed data from the position sensor 120, $K_2$ is an adjustment coefficient between the units of sensed data from the angular velocity sensor 110 and the position sensor 120, and $K_3$ is a transformation coefficient between the sensed data from the angular velocity sensor 110 and the control information corresponding to the drive device 160. It is noted that $G_0$ and $G_1$ are sensed data from the angular velocity sensor 110 at the 0th and 1st time point, and $H_0$, $H_1$ and $H_2$ are sensed data from the position sensor 120 at the 0th, 1st, and 2nd time point. Since sensed data of respective sensors is processed (taken the first or the second derivative thereof), the offset between different time points is eliminated to solve the problem of baseline drift.

In step S660, the drive device 160 is enabled to adjust the position of the image sensor 150 based on the control information. It is also understood that the drive device 160 of the invention is not limited to any kind of mechanism, and the control information and related coefficients ($K_2$ and $K_3$) are dependent on the drive device 160. The drive device 160 can move the position of the image sensor 150 according to the control information.

The invention does not calculate the integral of sensed data of the angular velocity sensor, but rather takes the first derivative of sensed data of the position sensor, or take the first derivative of sensed data of the angular velocity sensor and the second derivative of sensed data of the position sensor for camera vibration compensation.

Camera systems and methods with vibration compensation, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A camera system with vibration compensation, comprising:

a first sensor detecting an angle variation of a movement of a camera device to generate first sensed data;

a second sensor detecting a position movement of an image sensor of the camera device to generate second sensed data;

a drive device coupled to the image sensor; and a processing module receiving the first and second sensed data, taking the first derivative of the second sensed data, calculating control information according to at least the differential of the second sensed data, and enabling the drive device to adjust the position of the image sensor based on the control information.

2. The system of claim 1 wherein the processing module calculates the control information as:

$$F = \left| G - \frac{dH}{dt} K_0 \right| K_1,$$

where F is the control information, G is the first sensed data, H is the second sensed data, $K_0$ is an adjustment coefficient between the units of the first and second sensed data, and $K_1$ is a transformation coefficient between the first sensed data and the control information corresponding to the drive device.

3. The system of claim 1 wherein the processing module further takes the first derivative of the first sensed data and the second derivative of the second sensed data, and calculates the control information according to the differential of the first sensed data, and the second differential of the second sensed data.

4. The system of claim 3 wherein the processing module calculates the control information as:

$$F = \left| \frac{dG}{dt} - \frac{d^2 H}{dt^2} K_2 \right| K_3,$$

where F is the control information, G is the first sensed data, H is the second sensed data, $K_2$ is an adjustment coefficient between the units of the first and second sensed data, and $K_3$ is a transformation coefficient between the first sensed data and the control information corresponding to the drive device.

5. The system of claim 1 wherein the first sensor comprises a gyro sensor.

6. The system of claim 1 wherein the second sensor comprises a Hall effect sensor.

7. The system of claim 1 wherein the control information comprises a control voltage.

8. A camera method with vibration compensation, comprising:

detecting an angle variation of a movement of a camera device via a first sensor to obtain first sensed data;

detecting a position movement of an image sensor of the camera device via a second sensor to obtain second sensed data;

taking the first derivative of the second sensed data;

calculating a control information according to at least the differential of the second sensed data; and enabling a drive device to adjust the position of the image sensor based on the control information.

9. The method of claim 8 further comprising calculating the control information as:

$$F = \left| G - \frac{dH}{dt} K_0 \right| K_1,$$

where F is the control information, G is the first sensed data, H is the second sensed data, $K_0$ is an adjustment coefficient between the units of the first and second sensed data, and $K_1$ is a transformation coefficient between the first sensed data and the control information corresponding to the drive device.

10. The method of claim 8 further comprising:

taking the first derivative of the first sensed data;

taking the second derivative of the second sensed data; and calculating the control information according to the differential of the first sensed data, and the second differential of the second sensed data.

11. The method of claim 10 further comprising calculating the control information as:

$$F = \left| \frac{dG}{dt} - \frac{d^2 H}{dt^2} K_2 \right| K_3,$$

where F is the control information, G is the first sensed data, H is the second sensed data, $K_2$ is an adjustment coefficient between the units of the first and second sensed data, and $K_3$ is a transformation coefficient between the first sensed data and the control information corresponding to the drive device.

12. The method of claim 8 wherein the first sensed data comprises angular velocity signals of the camera device.

13. The method of claim 8 wherein the second sensed data comprises position signals of the image sensor.

14. The method of claim 8 wherein the control information comprises a control voltage for the drive device.

15. A camera system with vibration compensation, comprising:

a first sensor detecting an angle variation of a movement of a camera device to generate first sensed data;

a second sensor detecting a position movement of an image sensor of the camera device to generate second sensed data;

a processing module, comprising:

a first differentiator taking the first derivative of the second sensed data;

a combination unit processing the at least the differential of the second sensed data;

a proportional-integral-derivative (PID) controller receiving the processed data from the combination unit, and generating control information accordingly; and a drive device controller generating control signals based on the control information; and a drive device coupled to the image sensor, receiving the control signals, and adjusting the position of the image sensor accordingly.

16. The system of claim 15 further comprising a phase compensation unit calculating phase compensation data according to the first sensed data, and transmitting the phase compensation data to the combination unit, the combination unit processing the phase compensation data, the first sensed data, and the differential of the second sensed data.

17. The system of claim 15 further comprising at least an analog to digital converter converting the first and second sensed data from analog to digital.

18. The system of claim 15 further comprising a second differentiator taking the first derivative of the first sensed data, the first differentiator taking the second derivative of the second sensed data, and the combination unit processing the first differential of the first sensed data and the second differential of the second sensed data, and transmitting the processed data to the PID controller.

* * * * *